(12) United States Patent
El Mghazli et al.

(10) Patent No.: US 9,769,780 B2
(45) Date of Patent: Sep. 19, 2017

(54) REMOTE SMART CARD PERSONALIZATION WITHOUT THIRD PARTY

(71) Applicant: Alcatel Lucent, Boulogne Billancourt (FR)

(72) Inventors: Yacine El Mghazli, Nozay (FR); Abdullatif Shikfa, Nozay (FR)

(73) Assignee: Alcatel Lucent, Boulogne-Billancourt (FR)

(*) Notice: Subject to any disclaimer, the term of this patent is extended or adjusted under 35 U.S.C. 154(b) by 35 days.

(21) Appl. No.: 14/396,425

(22) PCT Filed: Jun. 11, 2013

(86) PCT No.: PCT/EP2013/061949
§ 371 (c)(1),
(2) Date: Oct. 23, 2014

(87) PCT Pub. No.: WO2013/189772
PCT Pub. Date: Dec. 27, 2013

(65) Prior Publication Data
US 2015/0105048 A1   Apr. 16, 2015

(30) Foreign Application Priority Data

Jun. 18, 2012 (EP) .................. 12305690

(51) Int. Cl.
*H04W 60/00* (2009.01)
*H04W 76/02* (2009.01)
(Continued)

(52) U.S. Cl.
CPC ........ *H04W 60/005* (2013.01); *H04W 4/003* (2013.01); *H04W 8/04* (2013.01);
(Continued)

(58) Field of Classification Search
None
See application file for complete search history.

(56) References Cited

U.S. PATENT DOCUMENTS

| 2010/0203864 | A1 | 8/2010 | Howard | |
| 2011/0047033 | A1* | 2/2011 | Mahaffey | G06Q 30/0269 705/14.66 |
| 2012/0264402 | A1* | 10/2012 | Zhang | H04L 63/0815 455/411 |

FOREIGN PATENT DOCUMENTS

| EP | 2182750 | 5/2010 |
| JP | 2007053674 | 3/2007 |

(Continued)

OTHER PUBLICATIONS

3GPP; 3rd Generation Partnership Project; Technical Specification Group Services and System Aspects; Feasibility study on the Security Aspects of Remote Provisioning and Change of Subscription for Machine to Machine (M2M) Equipment (Release 9); 3GPP Standard; 3GPP TR 33.812, 3rd Generation Partnership Project (3GPP); Mobile Competence Centre; 650, Route Des Lucioles; F-06921 Sophia-Antipolis Cedex; France; No. V9.2.0; Jun. 22, 2010; pp. 1-87; XP050441986.

(Continued)

*Primary Examiner* — Charles Appiah
*Assistant Examiner* — Margaret G Mastrodonato
(74) *Attorney, Agent, or Firm* — Patti & Malvone Law Group, LLC

(57) ABSTRACT

A method and apparatus for personalizing a smart card (SC) in a communication device of a subscriber of a first telecommunication network (TN), who wishes to become a subscriber of a second TN, is disclosed. A first identity and authentication key (AK) are stored in the SC. A first application server (AS) in the first TN receives a request of subscription change comprising an identifier of the second TN, establishes a secured session with a second AS of the (Continued)

second TN, and sends a message comprising the first identity and AK to the second AS so the SC can access the second TN. The second AS sends a second message including a personalization command, admin code, second identity and second AK to the communication device, which executes the personalization command to replace the first identity and AK with the second identity and the second AK if the admin code is valid.

15 Claims, 2 Drawing Sheets

(51) Int. Cl.
*H04W 8/04* (2009.01)
*H04W 8/18* (2009.01)
*H04W 4/00* (2009.01)
*H04W 8/20* (2009.01)
*H04W 12/04* (2009.01)
*H04W 12/06* (2009.01)
*H04W 4/14* (2009.01)

(52) U.S. Cl.
CPC ........... *H04W 8/186* (2013.01); *H04W 8/205* (2013.01); *H04W 12/04* (2013.01); *H04W 12/06* (2013.01); *H04W 76/02* (2013.01); *H04W 4/14* (2013.01)

(56) References Cited

FOREIGN PATENT DOCUMENTS

| | | |
|---|---|---|
| JP | 2008104002 | 5/2008 |
| JP | 2012520026 | 8/2012 |
| KR | 100862749 | 10/2008 |
| KR | 100983653 | 9/2010 |
| WO | 2009103623 | 8/2009 |

* cited by examiner

REMOTE SMART CARD PERSONALIZATION WITHOUT THIRD PARTY

FIELD OF THE INVENTION

The present invention relates to a remote personalization of a smart card via a telecommunication network, without intervention of any third party.

BACKGROUND

Mobile communications provides access by mobile phones, Personal Digital Assistant PDAs, portable computers and a variety of other user equipment to communicate via radio access networks (RANs) to core networks for connection to other mobile devices, the Internet, and conventional land-line phones. The RANs are distributed over a geographical area typically divided into cells that are served by a corresponding base station. Base stations communicate over an air interface with the user equipment, with several base stations being connected to a radio network controller (RNC) or base station controller (BSC) that is connected to one or more core networks. In the typical situation, secure communications for users of the system may be provided through encryption and decryption at the base station. Communications between the core network and the base station is encrypted and communications between the base station and the wireless user equipment is also encrypted.

Mobile Networks are using a strong authentication method based on a shared secret configured on the network side in the Authentication Center of the HLR or the HSS, and on the terminal side in the Universal Integrated Circuit Card (UICC) containing a SIM (Subscriber Identity Module) application for a GSM network or a USIM (Universal Subscriber Identity Module) in a UMTS network.

This shared secret is an authentication key and the action to configure a generic UICC card with a given authentication key is called personalization.

The authentication key is a 128 bit key used in the authentication and cipher key generation process. The authentication key is used to authenticate the UICC card on the mobile network. Each UICC contains this authentication key which is assigned to it by the operator during the personalization process.

So Mobile Network Operators (MNOs) are physically personalizing the UICC cards in their premises and once for all. Operators then send the personalized UICC card to the user, who will insert it in his mobile terminal to access the mobile network of the MNO. The personalization can also be outsourced to the UICC provider, but it is always configured physically and for ever.

When a user wants to change its MNO, the new MNO sends a new personalized UICC card and the user has to insert this new card into its mobile terminal to access the new network. This implies a problem for devices that should be sold with the UICC inside them (for e.g. security reasons), or devices that are difficult (or too costly) to access, like sensors, cars/trucks, vending machines . . . . For these devices, the manual replacement of the UICC card is too costly or even impossible.

There is need to allow easy reconfiguration of the UICC of the mobile terminal with a different set of credentials, in order to change the serving mobile network operator, without intervention of any third party involved in any exchange of credentials.

SUMMARY

To remedy the problems referred to hereinabove, a method for personalizing a smart card coupled with a communication device of a user being a subscriber of a first telecommunication network and wishing to become a subscriber of a second telecommunication network, a first international identity and a first authentication key being stored in the smart card, the method comprising the following steps in an application server included in the first telecommunication network:

receiving a request of subscription change comprising an identifier of the second telecommunication network, establishing a secured session with another application server of the second telecommunication network identified by the identifier, sending a message comprising the first international identity and the first authentication key to said another application server that allows the smart card to use resources of the second telecommunication network being authenticated by means of the first international identity and the first authentication key, in order that said another application server sends another message comprising a personalization command, an admin code, a second international identity and a second authentication key to the communication device, the smart card being able to interpret the personalization command to delete the first international identity and the first authentication key and replace them by the second international identity and the second authentication key if the admin code is valid.

The invention advantageously allows a remote reconfiguration of credentials associated with a telecommunication network operator and allows ability to easily change of the subscription of telecommunication network operator in a very flexible way, in a non-limited number of times. The remote reconfiguration of credentials is done without intervention of any third party, which confers security and confidentiality to the credentials transfer.

The invention advantageously enables new roaming offers which will benefit to the subscriber, since it will leverage on a local subscription without having to change its smart cards and allows embedment of smart cards into communication devices.

In an embodiment, the request of subscription change can be sent by the communication device or by an entity of the second telecommunication network after user agreement.

In an embodiment, the application server is able to communicate with a home location register of the first telecommunication network to retrieve the first international identity and the first authentication key and said another application server is able to communicate with a home location register of the second telecommunication network to provide the second international identity and the second authentication key.

In an embodiment, an application in the smart card can check if the admin code received in said another message is compatible with the admin code initially stored in the smart card in order to determine if the admin code is valid.

In an embodiment, said another message is an encrypted short message.

In an embodiment, said another message is decomposed in many messages.

In an embodiment, said another message contains data packets sent to the smart card through a service node and a gateway node of the second telecommunication network via a secured session.

In an embodiment, the message contains an admin code and said another application server retrieves the admin code from the received message.

In an embodiment, the message contains an identifier of the smart card and said another application server retrieves the admin code from a third-party server, by interrogating the third-party server having in memory the identifier is stored in correspondence with the admin code.

A further object of the invention is a method for personalizing a smart card coupled with a communication device of a user being a subscriber of a first telecommunication network and wishing to become a subscriber of a second telecommunication network, a first international identity and a first authentication key being stored in the smart card, the method comprising the following steps in an application server included in a second telecommunication network:

receiving a message comprising the first international identity and the first authentication key from another application server included in the first telecommunication network, after said another application server has received a request of subscription change comprising an identifier of the second telecommunication network and established a secured session with the application server of the second telecommunication network identified by the identifier, allowing the smart card to use resources of the second telecommunication network being authenticated by means of the first international identity and the first authentication key, sending another message comprising a personalization command, an admin code, a second international identity and a second authentication key to the communication device, the smart card being able to interpret the personalization command to delete the first international identity and the first authentication key and replace them by the second international identity and the second authentication key if the admin code is valid.

A further object of the invention is an application server for personalizing a smart card coupled with a communication device of a user being a subscriber of a first telecommunication network and wishing to become a subscriber of a second telecommunication network, a first international identity and a first authentication key being stored in the smart card, the application server being included in the first telecommunication network and comprising:

means for receiving a request of subscription change comprising an identifier of the second telecommunication network, means for establishing a secured session with another application server of the second telecommunication network identified by the identifier, and means for sending a message comprising the first international identity and the first authentication key to said another application server that allows the smart card to use resources of the second telecommunication network being authenticated by means of the first international identity and the first authentication key, in order that said another application server sends another message comprising a personalization command, an admin code, a second international identity and a second authentication key to the communication device, the smart card being able to interpret the personalization command to delete the first international identity and the first authentication key and replace them by the second international identity and the second authentication key if the admin code is valid.

A further object of the invention is an application server for personalizing a smart card coupled with a communication device of a user being a subscriber of a first telecommunication network and wishing to become a subscriber of a second telecommunication network, a first international identity and a first authentication key being stored in the smart card, the application server being included in a second telecommunication network and comprising:

means for receiving a message comprising the first international identity and the first authentication key from another application server included in the first telecommunication network, after said another application server has received a request of subscription change comprising an identifier of the second telecommunication network and established a secured session with the application server of the second telecommunication network identified by the identifier, means for allowing the smart card to use resources of the second telecommunication network being authenticated by means of the first international identity and the first authentication key, means for sending a second message comprising a personalization command, an admin code, a second international identity and a second authentication key to the communication device, the smart card being able to interpret the personalization command to delete the first international identity and the first authentication key and replace them by the second international identity and the second authentication key if the admin code is valid.

A further object of the invention is smart card coupled with a communication device of a user being a subscriber of a first telecommunication network and wishing to become a subscriber of a user being a subscriber of a first telecommunication network and wishing to become a subscriber of a second telecommunication network, a first international identity and a first authentication key being stored in the smart card, a first application server being included in the first telecommunication network and a second application server being included a second telecommunication network, the smart card comprising:

means for receiving a message comprising a personalization command, an admin code, a second international identity and a second authentication key from the second application server, after that the second application server has received a message comprising the first international identity and the first authentication key from the first application server, said first application server having initially received a request of subscription change comprising an identifier of the second telecommunication network and has established a secured session with the second application server of the second telecommunication network identified by the identifier, and after that the second application server has allowed the smart card to use resources of the second telecommunication network being authenticated by means of the first international identity and the first authentication key, means for interpreting the personalization command to delete the first international identity and the first authentication key and replace them by the second international identity and the second authentication key if the admin code is valid.

The invention relates further to computer programs adapted to be executed in servers for performing a personalization of a smart card coupled with a communication device, said program including instructions which, when the program is executed in said servers, execute the steps of the method of the invention.

BRIEF DESCRIPTION OF THE FIGURES

Some embodiments of the present invention are now described, by way of example only, and with reference to the accompanying drawings, in which.

The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
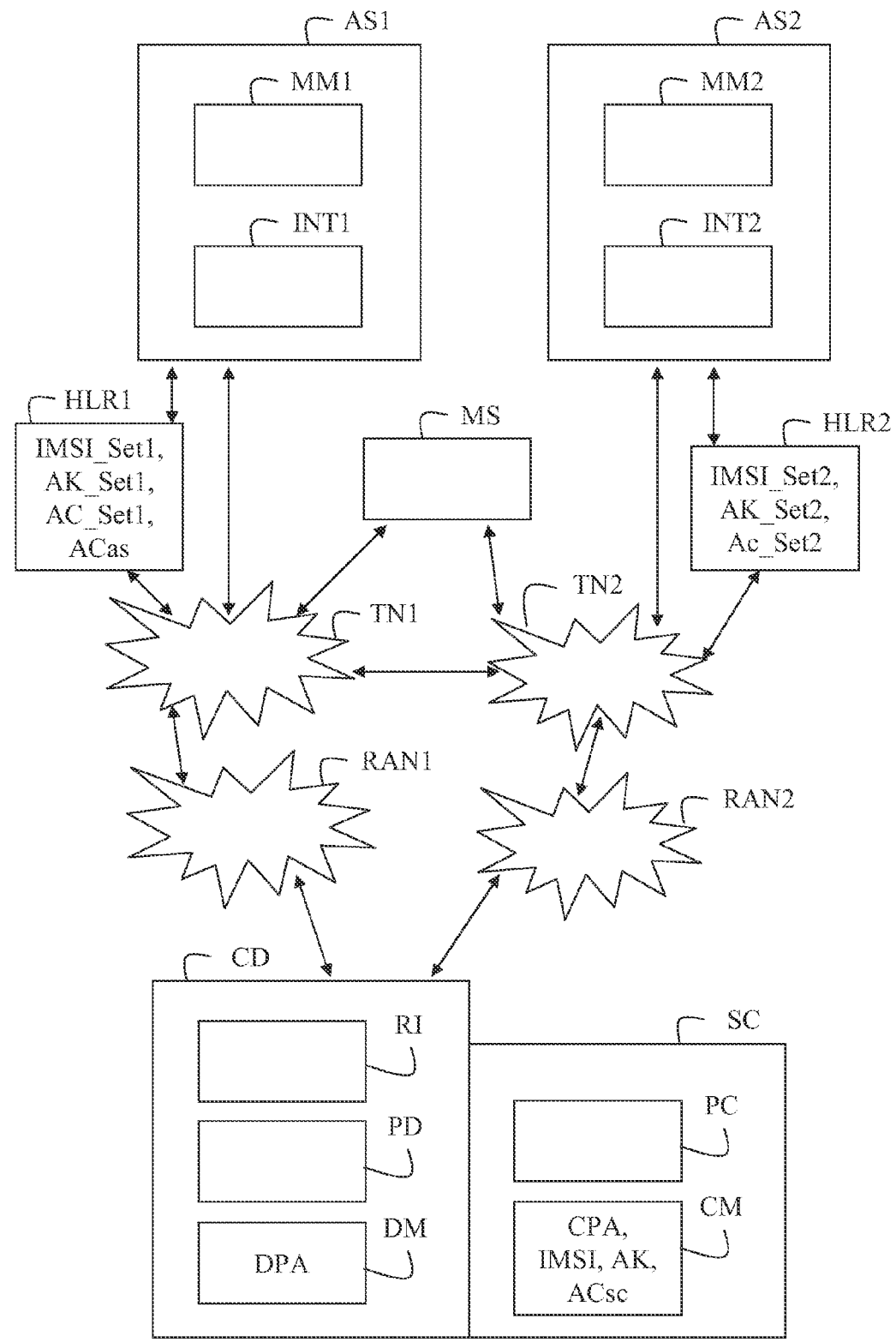
FIG. 1 is a schematic block-diagram of a communication system according to an embodiment of the invention.

Referring to FIG. 1, a communication system comprises a communication device CD, a first application server AS1 of a first telecommunication network TN1 and a second application server AS2 of a second telecommunication network TN1 which are able to communicate between them through the first telecommunication network TN1 and the second telecommunication network TN2.

For example, the telecommunication network TN1, TN2 is a digital cellular radio communication network of the GSM (Global System for Mobile communications) or UMTS (Universal Mobile Telecommunications System) or even CDMA (Code Division Multiple Access) type or even LTE (Long Term Evolution) type. The GSM type network may be coupled with a GPRS (General Packet Radio Service) network for the transmission of data by packets with mobility and access management via radio. For example, the telecommunication network is able to authorize a communication device to send and receive data via the network when the communication device is identified at the network, for example by means of a subscriber identification module associated with the communication device.

FIG. 1 does not represent known main components of the localization area of the telecommunication network where the communication device is situated. For example in a GSM type network, the localization area comprises an MSC (Mobile service Switching Center) which is connected by means of a BSC (Base Station Controller) to a base station BTS (Base Transceiver Station) connected by means of a radio link to the communication device.

The communication device CD can establish a connection with the telecommunication network TN1, TN2 through a respective radio access network RAN1, RAN2 via a radio link with the base station. The radio access networks are distributed over a geographical area typically divided into cells that are served by a corresponding base station. Base stations communicate over an air interface with the user equipment, with several base stations being connected to a radio network controller (RNC) or base station controller (BSC) that is connected to one or more core networks. In the typical situation, secure communications for users of the system may be provided through encryption and decryption at the base station.

Each telecommunication network TN1, TN2 comprises a respective Home Location Register HLR1, HLR2 and one or more Visitor Location Register connected to a switch MSC and/or to a service node SGSN (Serving GPRS Support Node). Each register HLR1, HLR2 collaborates with an authentication center that manages a respective database containing, in particular, a respective set IMSI_Set1, IMSI_Set2 of international identities IMSI (International Mobile Subscriber Identity) and a respective set AK_Set1, AK_Set2 of an authentication keys called AK each associated with a subscription profile for each user of the network and the number of the visitor location register to which the communication device is temporarily connected.

The radio access network of each telecommunication network is connected to a set of service nodes SGSN and gateway-nodes GGSN (Gateway GPRS Support Node) supporting a packet-switched core network of the telecommunication network and is connected to a switch MSC supporting a circuit-switched core network of the telecommunication network. All of the SGSN and GGSN nodes constitute a gateway connecting the radio access network and the packet core network. According to the invention, the application server AS1, AS2, may be directly or indirectly accessible from the gateway node GGSN of the corresponding telecommunication network via a packet communication network, for example the Internet, and also from the switch MSC via a Short Message Service Center SMSC.

In order to not encumber the FIG. 1, the mentioned service node SGSN, gateway-node GGSN and Short Message Service Center SMSC of each telecommunication network are not represented.

The communication device CD can be a radio communication mobile terminal. For example, the communication device CD is a mobile phone, or is a communicating Personal Digital Assistant PDA, or an intelligent telephone like SmartPhone.

In an example, the communication device CD is a cellular mobile radio communication terminal, connected by a channel to a radio access network of the telecommunication network TN, e.g. GSM (Global System for Mobile communications) or UMTS (Universal Mobile Telecommunications System) or LTE (Long Term Evolution).

By way of example, the communication device CD may be a motor vehicle belonging to a taxi company, or an automatic counter of a particular energy, such as water, gas, or electricity belonging to a company in the energy sector, or a beverage vending machine belonging to a company specializing in food vending. The communication device CD is therefore a fixed or mobile device that contains a UICC card and can communicate with the telecommunication network by means of the UICC card.

In other examples, the communication device CD can be replaced by any device which is equipped with a smart card reader and can communicate with the smart card.

In one embodiment, it is considered that the communication device CD is owned by a user who is a subscriber of the first telecommunication network TN1 and who wishes to become a subscriber of the second telecommunication network TN2, cancelling thus its subscription to the first telecommunication network.

In all cases, it is considered that the communication device and the smart card are owned by a user. For example, the user can be a physical person or an individual in case the communication device is a mobile terminal or a SmartPhone, and the user can be a moral person or a legal entity in case the communication device is a machine like a motor vehicle or an automatic counter.

The communication device CD is associated with a smart card SC, for example included in the communication device CD.

The communication device CD comprises a radio interface RI, a processor PD, device memories MD and a smart card reader. The memories MD comprise various memories such as ROM memory, nonvolatile memory EEPROM or Flash, and RAM memory.

The radio interface RI transposes in frequency, converts digitally, demodulates and decodes messages received via the telecommunication network TN, and inversely transmits messages.

The device memories MD comprise the operating system of the communication device CD and an execution environment such as a Java virtual machine JVMT programmed in Java, for example J2ME.

In particular, in the nonvolatile memory of device memories MD are implemented device applications, originally written in a high level language of type object-oriented such as language Java compatible with virtual machine JVMT. The virtual machine JVMT can communicate with a virtual machine JVMC installed in the smart card SC via a predetermined communication protocol, like protocol APDU.

In order that device applications respectively communicate with card applications implemented in the smart card SC in accordance with predetermined communication protocol, an access interface to access resources and data in the smart card is implemented in the device memories DM for example under the form of a Java API (Application Programming Interface).

Device memories DM further include a communication interface, for example the SIM Toolkit engine, so that a main application SIM or USIM or any other application in the smart card communicates with the "outside world" via the communication device, for example with an application server. The communication interface manages commands and responses exchanged between the "outside world" and the main application SIM or USIM, for example by adapting them to short messages exchanged with a short message server.

The smart card SC, also known as microcontroller card or integrated circuit card, is a user identity module of UICC type associated with the communication device.

In one embodiment, a microcontroller in the smart card SC mainly comprises one or more processors PC, and card memories CM. The smart card exchange commands, or requests, and replies with the communication device CD via an input/output port of the smart card reader of the communication device CD with or without contact. The various components of the smart card may be interconnected by a bidirectional bus.

Card memories CM comprise memory of type Flash or ROM including codes and data for example of an operating system and a virtual machine JVMC compliant with the Java Card specification, or any other operating system.

Card memories CM comprise also memory of type Flash or EEPROM for storing for example identity numbers and other parameters of the profile of the user possessing the card, such as a PIN code, an international identity, an authentication key, an admin code, and other security data. It is considered that the communication device CD is owned by a user who is a subscriber of the first telecommunication network TN1, so card memories CM contains an admin code ACsc for accessing or modifying the smart card, and contains also an international identity IMSI_1 and with an authentication key AK_1, used to authenticate the user by the first telecommunication network TN1.

Card memories CM comprise also memory of type RAM serving more particularly to data processing.

Card memories CM comprise also a memory space to store card applications which are proprietary code or applets STK, e.g. SIM ToolKit, and that are installed during the manufacture of the smart card or possibly installed during use of the card at the request of the user or the operator.

In particular, a card personalization application CPA is stored in the card memories CM and has a read/write access especially to the international identity IMSI and the authentication key AK, for example under an OTA command presenting the admin code ACsc. The card personalization application CPA is able to handle commands and messages according to an over-the-air (OTA) mechanism and is able to communicate with a corresponding device personalization application DPA stored in the device memories DM of the communication device CD for some functionalities such as an interface with the user, and is also able to communicate with the application server AS for the personalization of the smart card.

Each telecommunication network TN1, TN2, comprises a respective application server AS1, AS2. The application server is a platform that is accessible from the communication device CD through the corresponding telecommunication network.

Each application server AS1, AS2, is able to communicate with the corresponding register HLR1, HLR2 directly and the application servers AS1 and AS2 able to communicate between them through the first and the second telecommunication networks TN1 and TN2, via a secured session for example of IPsec (Internet Protocol Security) type or SS7 (Signaling System #7) type.

Each application server AS1, AS2, comprises a respective messaging module MM1, MM2, handling exchange of messages with the communication device CD, for example in the form of short message through a short message center, and handling exchange of messages with entities of the first and the second telecommunication networks TN1 and TN2.

Each application server AS1, AS2, comprises a respective interface INT1, INT2, for communicating with the respective register HLR1, HLR2.

In one embodiment, as represented in FIG. 1, each register HLR1, HLR2, manages a respective set AC_Set1, AC_Set2 of admin codes. It is considered that an admin code allows a command provided through an OTA mechanism to obtain read/write access to the space memory of a smart card where the international identity IMSI and the authentication key AK are stored. Each admin code of the respective set AC_Set1, AC_Set2, is thus associated with a couple of an international identity IMSI of the respective set IMSI_Set1, IMSI_Set2, and of an authentication keys AK of the respective set AK_Set1, AK_Set2. Each register HLR1, HLR2, manages admin codes ACas for accessing or modifying the corresponding smart card.

In another embodiment, each application server AS1, AS2, manages a respective database wherein admin codes ACas are stored in correspondence with identifiers IdSC of smart cards, same identifiers IdSC of smart cards being stored in correspondence with respective international identities IMSI and respective authentication keys AK of the smart cards in the respective registers HLR1, HLR2.

In another embodiment, admin codes ACas are stored in correspondence with identifiers IdSC of smart cards in a managing server MS that is external to the respective telecommunication networks, forming a third-party server managing the access rights to the smart cards. For example, the managing server MS is owned by the manufacturer of the smart cards. In the case, same identifiers IdSC of smart cards are stored also in correspondence with respective international identities IMSI and respective authentication keys AK of the smart cards in the respective registers HLR1, HLR2.

An application server is able to transmit a couple of international identity IMSI and authentication key AK, associated with an admin code, to the other application server through a secure session. For example, the application server AS1 of the first telecommunication network TN1 can transmit a couple of an international identity IMSI of the respective set IMSI_Set1 and authentication key AK the respective set AC_Set1 to the application server AS2 of the second telecommunication network TN2.

Figure 2:
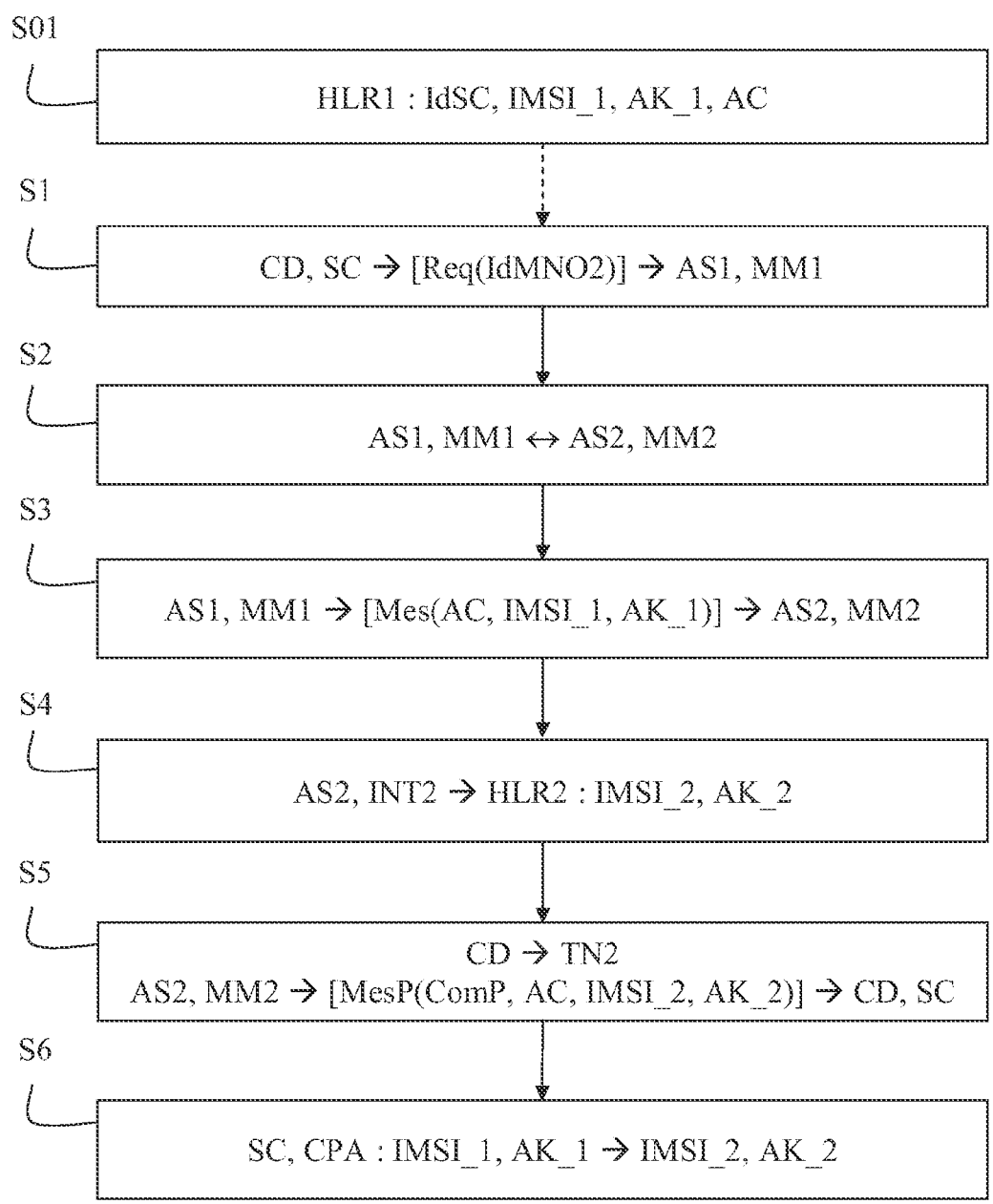
FIG. 2 is a flowchart showing steps performed to execute a method for personalizing a smart card coupled with a communication device in a telecommunication network according to an embodiment of the invention.

With reference to FIG. 2, a method for personalizing a smart card coupled with a communication device according to one embodiment of the invention comprises steps S1 to S6 executed automatically within the communication system.

The method is described hereinafter with reference to the first and the second telecommunication networks TN1 and TN2 for a user who is a subscriber of the first telecommunication network TN1 and who wishes to become a subscriber of the second telecommunication network TN2, but can be extended to more telecommunication networks.

At an initial step S01, the first and the second telecommunication networks TN1 and TN2 make agreement for potential subscription change of users and set encryption keys for sessions dedicated for such subscription change.

Once a smart card is provided to the operator and attributed to a user who becomes a subscriber of the operator, the operator personalizes the smart card by creating an international identity and an authentication key. The personalization of the smart card could be also outsourced to the smart card manufacturer.

In one embodiment, the created international identity and authentication key are stored in correspondence in the register HLR in correspondence with an admin code for accessing the smart card.

In another embodiment, the created international identity and authentication key are stored in correspondence in the register HLR in correspondence with an identifier IdSC of the smart card, this identifier IdSC being stored in correspondence with an admin code for accessing the smart card in the application server or in the managing server.

In the example embodiment, a user becomes a subscriber of the first telecommunication network TN1. The database of register HLR1 contains an admin code ACas for accessing the smart card stored in correspondence with an international identity IMSI_1 included in the set IMSI_Set1 and with an authentication key AK_1 included in the set AK_Set1. Also, it is considered that the admin code ACas, the international identity IMSI_1, and the authentication key AK_1 are stored in correspondence with an identifier IdSC of the smart card. Also, the international identity IMSI_1 and the authentication key AK_1 are stored in the card memories CM of the smart card SC.

At step S1, the user solicits a request in order to change its operator subscription for the operator of the second telecommunication network TN2. For example, the user selects a command in a menu displayed in the communication device by a device personalization application DPA or enters a code of command read from a document of the operator.

The communication device CD sends a request Req comprising an identifier IdMNO2 of the second telecommunication network TN2 to the first application server AS1.

In one embodiment, the request Req is in the form of a short message which is handled by a short message center that transforms the message into data packets and sends the data packets through first the telecommunication network TN1 to the first application server AS1.

In a variant embodiment, the user does not transmit the request to the application server but the user contacts a customer center of the operator of the second telecommunication network TN2, for example via a contact center or a web site, and provides an identifier IdSC of the smart card to the operator. After user agreement, an entity of the operator sends a similar request Req to the application server AS, the request comprising an identifier IdMNO2 of the second telecommunication network TN2 and the identifier IdSC of the smart card.

The messaging module MM1 of the first application server AS1 receives the request and interprets it as a request of subscription change in favor of the operator of the second telecommunication network TN2 thanks to the received identifier IdMNO2.

In one embodiment, the interface INT1 of the first application server AS1 retrieves in the database of the register HLR1 the admin code ACas for accessing the smart card, the international identity IMSI_1 and the authentication key AK_1, by means of credentials sent by the communication device CD in case the request Req is received from the communication device CD, or by means of the identifier IdSC of the smart card in case the request Req is received from an entity of the second telecommunication network TN2.

In another embodiment, the interface INT1 of the first application server AS1 retrieves in the database of the register HLR1 only the international identity IMSI_1 and the authentication key AK_1, and retrieves the admin code ACas for accessing the smart card in its own database, by means of credentials sent by the communication device CD and of the identifier IdSC of the smart card stored in correspondence with the international identity IMSI_1 and the authentication key AK_1 in the register HLR1.

In another embodiment, the interface INT1 of the first application server AS1 retrieves in the database of the register HLR1 the international identity IMSI_1, the authentication key AK_1 and the identifier IdSC of the smart card, the admin code ACas being stored in the managing server MS.

Optionally, the messaging module MM1 of the first application server AS1 sends a message to the communication device CD, containing an indication that subscription change request is accepted and will be processed.

At step S2, the messaging module MM1 of the first application server AS1 establishes a secured session, for example of IPsec type or SS7 type, with the messaging module MM2 of the second application server AS2 of the second telecommunication network TN2, identified by the identifier IdMNO2.

At step S3, the messaging module MM1 of the first application server AS1 sends a message Mes to the second application server AS2, the message comprising the international identity IMSI_1 and the authentication key AK_1.

In one embodiment, the message Mes contains also the admin code ACas for accessing the smart card.

In another embodiment, the message Mes contains also the identifier IdSC of the smart card.

At step S4, the messaging module MM2 of the second application server AS2 receives the message Mes. The second application server AS2 commands the operator of the second telecommunication network TN2 to configure this latter to temporarily authorize access by the communication device CD by means of the international identity IMSI_1 and the authentication key AK_1.

The communication device CD is allowed to use resources of the second telecommunication network that enables connectivity to its circuit-switched core network and its packet-switched core network. In case the user is allowed to use the packet-switched core network, the node SGSN creates a PDP (Packet Data Network) context to exchange data with the communication device CD. A PDP context is a set of information describing a multimedia service and comprising parameters for communicating with a service server, using a specific protocol, such as the IP or X.25 protocol, and with a determined quality of service. An activation procedure called "PDP Context Activation" enables the communication device CD to be known to the node-gateway GGSN which connects the radio access network RAN2 serving the communication device CD with the packet-switched core network of the second telecommunication network TN2 connected to the second application server AS2. At this end, the second telecommunication network TN2 can define an access point name (APN) dedicated to the services provided by the second application server AS2, allowing the user to use internet connection of the second telecommunication network only for the personalization service.

The interface INT2 of the second application server AS2 collaborates with the register HLR2 to provide a free international identity that will be associated with the user in order that this latter becomes subscriber to the second telecommunication network TN2. The register HLR2 provides an international identity IMSI_2 that is included in the set IMSI_Set2 and stored in correspondence with an authentication key AK_2 that is included in the set AK_Set2.

At step S5, when the communication device CD becomes attached to the second telecommunication network TN2, the communication device CD being authenticated by means of the international identity IMSI_1 and the authentication key AK_1, the messaging module MM2 of the second application server AS2 sends a personalization message MesP to the communication device CD. The personalization message MesP comprises a personalization command ComP, the admin code ACas, the international identity IMSI_2 and the authentication key AK_2 The personalization message MesP is sent from the second application server AS2 across the second networks TN2 and RAN2 to the smart card SC via the communication interface of the communication device CD.

In one embodiment, the received message Mes contains the admin code ACas for accessing the smart card and the messaging module MM2 of the second application server AS2 retrieves this admin code ACas from the received message Mes.

In another embodiment, the message Mes contains the identifier IdSC of the smart card and the messaging module MM2 of the second application server AS2 retrieves this admin code ACas by interrogating the managing server MS, by means of the identifier IdSC that is stored in correspondence with the admin code ACas in the managing server MS.

In one embodiment, the personalization message MesP is transformed by a short message center of the second telecommunication network TN2 into a short message that is encrypted. The received personalization message MesP is decrypted by the smart card and the content of the message is temporarily stored in the card memories CM of the smart card to be executed by the card personalization application CPA.

In another embodiment, the second application server AS2 sends initially a short message to communication device CD in order that this lattertriggers a procedure of type "GPRS Attach", by the manual action of the user or by the automatic action of the card personalization application CPA, which makes it possible to establish a logic link between the communication device CD and the node SGSN and to activate a PDP context to send and receive data from the communication device CD. The smart card CD sends a request containing data packets to the second application server AS2 through the SGSN and GGSN nodes via a secured session for example of IPsec (Internet Protocol Security) type. In an embodiment, the request ReqP is sent toward an APN restricted and dedicated to the services provided by the second application server AS2. The second application server AS2 then creates the personalization message MesP containing data packets and transmit it to the communication device CD through the SGSN and GGSN nodes via a secured session for example of IPsec (Internet Protocol Security) type.

Optionally, the second application server AS2 includes also another admin code in the personalization message MesP, in order to replace then the admin code ACas, after that the credentials IMSI_1 and AK_1 have been replaced by the new credentials IMSI_2 and AK_2.

At step S6, the card personalization application CPA interprets the personalization command ComP to execute the personalization of the smart card SC. The card personalization application CPA checks if the admin code ACas is valid, that is to say if the admin code ACas received in the personalization message MesP is compatible with the admin code ACsc initially stored in the smart card. In one example, the admin code ACas received in the personalization message MesP has to be the same as the admin code ACsc initially stored in the smart card. More generally, the admin codes may be tools used for authentication and ciphering procedures, in particular in case the personalization message MesP is decomposed in many messages.

If the admin code ACas is valid, the card personalization application CPA deletes the identity IMSI_1 and the authentication key AK_1 initially stored in the card memories CM of the smart card SC, and replace them by the received international identity IMSI_2 and authentication key AK_2.

Optionally, the card personalization application CPA can activate the device personalization application DPA in order to ask an acknowledgement of the user for the card personalization. For example, the device personalization application DPA displays a question like the following: "Are you sure to change MNO and to become subscriber of MNO2?".

At step S7, the communication device CD can launch a connection request to be attached to the second telecommunication network TN2, for example by sending a "IMSI-attach" signalling message.

The operator of the second telecommunication network TN2 is aware of the success of the personalization of the smart card, for example after a successful authentication of the communication device CD by the second telecommunication network TN2, and informs the second application server AS2. The second application server AS2 then informs the operator of the first telecommunication network TN1 that the user is not a subscriber of this latter anymore. Thus, both first and second application server can remove the international identity IMSI_1 and the authentication key AK_1 from their respective database.

The invention described here relates to a method and servers for a personalization of a smart card coupled with a communication device. In an embodiment, the steps of the method of the invention are determined by the instructions of a computer program incorporated in a server such as the first application server AS1 or the second application server AS2 according to the invention. The program includes program instructions which, when said program is executed in a processor of the server the operation whereof is then controlled by the execution of the program, execute the steps of the method according to the invention.

As a consequence, the invention applies also to a computer program, in particular a computer program on or in an information medium readable by a data processing device, adapted to implement the invention. That program may use any programming language and be in the form of source code, object code or an intermediate code between source code and object code, such as a partially compiled form, or in any other desirable form for implementing the method according to the invention.

The information medium may be any entity or device capable of storing the program. For example, the medium may include storage means or a recording medium on which the computer program according to the invention is recorded, such as a ROM, for example a CD ROM or a microelectronic circuit ROM, or a USB key, or magnetic recording means, for example a diskette (floppy disk) or a hard disk.

The invention claimed is:

1. A method for personalizing a smart card coupled with a communication device of a user being a subscriber of a first telecommunication network and wishing to become a subscriber of a second telecommunication network, thereby cancelling a subscription to the first telecommunication network, a first international identity and a first authentication key being stored in the smart card for authenticating the user in the first telecommunication network, the method comprising the following steps in a first application server included in the first telecommunication network:
   receiving a request of subscription change comprising an identifier of the second telecommunication network,
   establishing a secured session with a second application server of the second telecommunication network identified by the identifier,
   sending a first message comprising the first international identity and the first authentication key to said second application server that allows the smart card to temporarily use resources of the second telecommunication network while being authenticated by means of the first international identity and the first authentication key of the first telecommunication network,
   in order that said second application server sends a second message comprising a personalization command, an admin code, a second international identity and a second authentication key for authenticating the user in the second telecommunication network to the communication device, the smart card being able to interpret the personalization command to delete the first international identity and the first authentication key and replace them by the second international identity and the second authentication key if the admin code is valid.

2. A method according to claim 1, wherein the request of subscription change is sent by the communication device or by an entity of the second telecommunication network after user agreement.

3. A method according to claim 1, wherein the application server is able to communicate with a home location register of the first telecommunication network to retrieve the first international identity and the first authentication key and said second application server is able to communicate with a home location register of the second telecommunication network to provide the second international identity and the second authentication key.

4. A method according to claim 1, wherein an application in the smart card checks if the admin code received in said second message is compatible with the admin code initially stored in the smart card in order to determine if the admin code is valid.

5. A method according to claim 1, wherein said second message is an encrypted short message.

6. A method according to claim 5, wherein said second message is decomposed in many messages.

7. A method according to claim 1, wherein said second message contains data packets sent to the smart card through a service node and a gateway node of the second telecommunication network via a secured session.

8. A method according to claim 1, wherein the first message contains an admin code and said second application server retrieves the admin code from the received first message.

9. A method according to claim 1, wherein the first message contains an identifier of the smart card and said second application server retrieves the admin code from a third-party server, by interrogating the third-party server having in memory the identifier is stored in correspondence with the admin code.

10. A method for personalizing a smart card coupled with a communication device of a user being a subscriber of a first telecommunication network and wishing to become a subscriber of a second telecommunication network, thereby cancelling a subscription to the first telecommunication network, a first international identity and a first authentication key being stored in the smart card for authenticating the user in the first telecommunication network, the method comprising the following steps in an application server included in a second telecommunication network:
   receiving a message comprising the first international identity and the first authentication key from another application server included in the first telecommunication network, after said another application server has received a request of subscription change comprising an identifier of the second telecommunication network and established a secured session with the application server of the second telecommunication network identified by the identifier,
   allowing the smart card to temporarily use resources of the second telecommunication network while being authenticated by means of the first international identity and the first authentication key of the first telecommunication network,
   sending another message comprising a personalization command, an admin code, a second international identity and a second authentication key for authenticating the user in the second telecommunication network to the communication device, the smart card being able to interpret the personalization command to delete the first international identity and the first authentication key and replace them by the second international identity and the second authentication key if the admin code is valid.

11. An application server for personalizing a smart card coupled with a communication device of a user being a subscriber of a first telecommunication network and wishing to become a subscriber of a second telecommunication network, thereby cancelling a subscription to the first telecommunication network, a first international identity and a first authentication key being stored in the smart card for authenticating the user in the first telecommunication network, the application server being included in the first telecommunication network and comprising:

means for receiving a request of subscription change comprising an identifier of the second telecommunication network, means for establishing a secured session with a second application server of the second telecommunication network identified by the identifier, and means for sending a first message comprising the first international identity and the first authentication key to said second application server that allows the smart card to temporarily use resources of the second telecommunication network while being authenticated by means of the first international identity and the first authentication key of the first telecommunication network, in order that said second application server sends second message comprising a personalization command, an admin code, a second international identity and a second authentication key for authenticating the user in the second telecommunication network to the communication device, the smart card being able to interpret the personalization command to delete the first international identity and the first authentication key and replace them by the second international identity and the second authentication key if the admin code is valid.

12. An application server for personalizing a smart card coupled with a communication device of a user being a subscriber of a first telecommunication network and wishing to become a subscriber of a second telecommunication network, thereby cancelling a subscription to the first telecommunication network, a first international identity and a first authentication key being stored in the smart card for authenticating the user in the first telecommunication network, the application server being included in a second telecommunication network and comprising:

means for receiving a message comprising the first international identity and the first authentication key from another application server included in the first telecommunication network, after said another application server has received a request of subscription change comprising an identifier of the second telecommunication network and established a secured session with the application server of the second telecommunication network identified by the identifier, means for allowing the smart card to temporarily use resources of the second telecommunication network while being authenticated by means of the first international identity and the first authentication key of the first telecommunication network, means for sending a second message comprising a personalization command, an admin code, a second international identity and a second authentication key for authenticating the user in the second telecommunication network to the communication device, the smart card being able to interpret the personalization command to delete the first international identity and the first authentication key and replace them by the second international identity and the second authentication key if the admin code is valid.

13. A computer-implemented method executed in an application server for personalizing a smart card coupled with a communication device of a user being a subscriber of a first telecommunication network and wishing to become a subscriber of a second telecommunication network, thereby cancelling a subscription to the first telecommunication network, a first international identity and a first authentication key being stored in the smart card for authenticating the user in the first telecommunication network, the application server being included in the first telecommunication network, said program including instructions which, when said program is executed in said application server, execute the following steps:

receiving a request of subscription change comprising an identifier of the second telecommunication network, establishing a secured session with second application server of the second telecommunication network identified by the identifier, sending a first message comprising the first international identity and the first authentication key to said second application server that allows the smart card to temporarily use resources of the second telecommunication network while being authenticated by means of the first international identity and the first authentication key of the first telecommunication network, in order that said second application server sends a second message comprising a personalization command, an admin code, a second international identity and a second authentication key for authenticating the user in the second telecommunication network to the communication device, the smart card being able to interpret the personalization command to delete the first international identity and the first authentication key and replace them by the second international identity and the second authentication key if the admin code is valid.

14. A computer-implemented method executed in an application server for personalizing a smart card coupled with a communication device of a user being a subscriber of a first telecommunication network and wishing to become a subscriber of a second telecommunication network, thereby cancelling a subscription to the first telecommunication network, a first international identity and a first authentication key being stored in the smart card for authenticating the user in the first telecommunication network, the application server being included in a second telecommunication network, said program including instructions which, when said program is executed in said application server, execute the following steps:

receiving a message comprising the first international identity and the first authentication key from another application server included in the first telecommunication network, after said another application server has received a request of subscription change comprising an identifier of the second telecommunication network and established a secured session with the application server of the second telecommunication network identified by the identifier, allowing the smart card to temporarily use resources of the second telecommunication network while being authenticated by means of the first international identity and the first authentication key of the first telecommunication network, sending another message comprising a personalization command, an admin code, a second international identity and a second authentication key for authenticating the user in the second telecommunication network to the communication device, the smart card being able to interpret the personalization command to delete the first international identity and the first authentication key and replace them by the second international identity and the second authentication key if the admin code is valid.

15. A smart card coupled with a communication device of a user being a subscriber of a first telecommunication network and wishing to become a subscriber of a user being a subscriber of a first telecommunication network and wishing to become a subscriber of a second telecommunication network, thereby cancelling a subscription to the first telecommunication network, a first international identity and a first authentication key being stored in the smart card for authenticating the user in the first telecommunication network, a first application server being included in the first telecommunication network and a second application server being included a second telecommunication network, the smart card comprising:

means for receiving a message comprising a personalization command, an admin code, a second international identity and a second authentication key from the second application server, after that the second application server has received a message comprising the first international identity and the first authentication key from the first application server, said first application server having initially received a request of subscription change comprising an identifier of the second telecommunication network and has established a secured session with the second application server of the second telecommunication network identified by the identifier, and after that the second application server has temporarily allowed the smart card to use resources of the second telecommunication network being authenticated by means of the first international identity and the first authentication key of the first telecommunication network, means for interpreting the personalization command to delete the first international identity and the first authentication key and replace them by the second international identity and the second authentication key for authenticating the user in the second telecommunication network if the admin code is valid.

* * * * *